US011813571B2

United States Patent
Bergstrom et al.

(10) Patent No.: US 11,813,571 B2
(45) Date of Patent: Nov. 14, 2023

(54) THERMAL ENERGY CONVERSION SUBMERGED REVERSE OSMOSIS DESALINATION SYSTEM

(71) Applicant: Natural Ocean Well Co., Culver City, CA (US)

(72) Inventors: Robert A. Bergstrom, Culver City, CA (US); Michael M. Porter, Culver City, CA (US)

(73) Assignee: NATURAL OCEAN WELL CO., Culver City, CA (US)

( * ) Notice: Subject to any disclaimer, the term of this patent is extended or adjusted under 35 U.S.C. 154(b) by 0 days.

(21) Appl. No.: 17/732,398

(22) Filed: Apr. 28, 2022

(65) Prior Publication Data

US 2022/0266198 A1     Aug. 25, 2022

Related U.S. Application Data

(63) Continuation of application No. PCT/US2020/058567, filed on Nov. 2, 2020.
(Continued)

(51) Int. Cl.
*B01D 61/08* (2006.01)
*B01D 61/02* (2006.01)
(Continued)

(52) U.S. Cl.
CPC ........... *B01D 61/08* (2013.01); *B01D 61/025* (2013.01); *B01D 61/026* (2022.08); *B01D 61/04* (2013.01);
(Continued)

(58) Field of Classification Search
CPC .... B01D 61/08; B01D 61/025; B01D 61/026; B01D 61/04; B01D 61/06; B01D 61/10;
(Continued)

(56) References Cited

U.S. PATENT DOCUMENTS

| 3,171,808 A | 3/1965 | Todd |
| 3,456,802 A | 7/1969 | Cole |

(Continued)

FOREIGN PATENT DOCUMENTS

| GB | 2068774 | 8/1981 |
| JP | H 07317508 | 12/1995 |

(Continued)

OTHER PUBLICATIONS

Bernardoni et al., Techno-economic analysis of closed otec cycles for power generation, Methodology, 144 pages, 2015-2016.
(Continued)

*Primary Examiner* — Jason M Greene
*Assistant Examiner* — Eric J McCullough
(74) *Attorney, Agent, or Firm* — Patterson Thuente, P.A.

(57) ABSTRACT

A submersible reverse osmosis desalination apparatus uses low temperature concentrate or brine from the desalination apparatus to provide a high volume cold liquid stream to an Ocean Thermal Energy Conversion (OTEC) heat engine. The OTEC engine also employs a warm liquid stream and uses the cold and warm liquid streams to obtain electrical power from a closed-cycle or open-cycle heat exchange and generator system. Use of the concentrate or brine stream provides a much greater liquid volume and much greater cold thermal energy content than would be obtained by using cold desalinated product water from the desalination apparatus in the OTEC heat engine.

30 Claims, 6 Drawing Sheets

Related U.S. Application Data (60) Provisional application No. 62/929,564, filed on Nov. 1, 2019.

(51) Int. Cl.

| | | |
|---|---|---|
| *B01D 61/04* | (2006.01) | |
| *B01D 65/00* | (2006.01) | |
| *C02F 1/44* | (2023.01) | |
| *F04D 29/58* | (2006.01) | |
| *F03G 7/05* | (2006.01) | |
| *B01D 61/10* | (2006.01) | |
| *B01D 61/06* | (2006.01) | |
| *C02F 103/08* | (2006.01) | |

(52) U.S. Cl.
CPC ............ *B01D 61/06* (2013.01); *B01D 61/10* (2013.01); *B01D 65/003* (2013.01); *C02F 1/441* (2013.01); *F03G 7/05* (2013.01); *F04D 29/588* (2013.01); *B01D 2311/08* (2013.01); *B01D 2313/06* (2013.01); *B01D 2313/125* (2013.01); *B01D 2313/13* (2013.01); *B01D 2313/243* (2013.01); *B01D 2313/36* (2013.01); *B01D 2313/365* (2013.01); *B01D 2313/44* (2013.01); *B01D 2313/54* (2013.01); *B01D 2313/56* (2013.01); *B01D 2315/06* (2013.01); *B01D 2317/04* (2013.01); *B01D 2319/04* (2013.01); *C02F 2103/08* (2013.01); *C02F 2201/002* (2013.01); *C02F 2201/004* (2013.01); *C02F 2201/006* (2013.01); *C02F 2201/007* (2013.01); *C02F 2201/009* (2013.01); *C02F 2209/03* (2013.01); *C02F 2209/05* (2013.01); *C02F 2209/06* (2013.01); *C02F 2209/22* (2013.01); *C02F 2209/40* (2013.01); *C02F 2303/14* (2013.01)

(58) Field of Classification Search
CPC .............. B01D 65/003; B01D 2311/08; B01D 2313/06; B01D 2313/125; B01D 2313/13; B01D 2313/243; B01D 2313/36; B01D 2313/18; B01D 2313/20; B01D 2313/365; B01D 2313/44; B01D 2313/54; B01D 2313/56; B01D 2315/06; B01D 2317/04; B01D 2319/04; C02F 1/441; C02F 2103/08; C02F 2201/002; C02F 2201/004; C02F 2201/006; C02F 2201/007; C02F 2201/009; C02F 2209/03; C02F 2209/05; C02F 2209/06; C02F 2209/22; C02F 2209/40; C02F 2303/14; C02F 2201/008; F03G 7/05; F04D 29/588; Y02A 20/131; Y02A 20/212; Y02E 10/30; Y02W 10/37

See application file for complete search history.

(56) References Cited

U.S. PATENT DOCUMENTS

| | | |
|---|---|---|
| 4,125,463 A | 11/1978 | Chenowith |
| 4,311,012 A | 1/1982 | Finley |
| 4,334,992 A | 6/1982 | von Bonin et al. |
| 5,192,434 A | 3/1993 | Moller |
| 5,229,005 A | 7/1993 | Fok et al. |
| 5,366,635 A | 11/1994 | Watkins |
| 5,620,605 A | 4/1997 | Moller et al. |
| 5,788,858 A | 8/1998 | Acernase et al. |
| 5,914,041 A | 6/1999 | Chancellor |
| 5,944,999 A | 8/1999 | Chancellor et al. |
| 5,972,216 A | 10/1999 | Acernase et al. |
| 5,980,751 A | 11/1999 | Chancellor |
| 6,100,600 A * | 8/2000 | Pflanz ............... C02F 1/441 299/9 |
| 6,149,393 A * | 11/2000 | Chancellor ............. F16L 9/006 417/409 |
| 6,149,788 A * | 11/2000 | Tessier ................ C02F 1/4602 204/632 |
| 6,348,148 B1 | 2/2002 | Bosley |
| 8,282,823 B2 | 10/2012 | Acernase et al. |
| 8,567,195 B2 | 10/2013 | Nash |
| 8,685,252 B2 | 4/2014 | Vuong et al. |
| 9,227,159 B2 | 1/2016 | DuFresne et al. |
| 2006/0065597 A1 | 3/2006 | Kunczynski |
| 2008/0190849 A1 | 8/2008 | Vuong |
| 2010/0270236 A1 | 10/2010 | Scialdone |
| 2010/0276369 A1 | 11/2010 | Haag |
| 2012/0255908 A1* | 10/2012 | Duke .................. B01D 61/025 210/652 |
| 2013/0042612 A1* | 2/2013 | Shapiro .................... F03G 7/05 60/641.7 |
| 2015/0027937 A1* | 1/2015 | Katou ...................... C02F 1/16 210/180 |
| 2018/0001263 A1 | 1/2018 | Johnson et al. |

FOREIGN PATENT DOCUMENTS

| | | |
|---|---|---|
| JP | 2003176775 | 6/2003 |
| JP | 201622460 | 12/2007 |
| JP | 2007331681 | 12/2007 |
| JP | 2013167156 | 8/2013 |
| KR | 101067422 | 9/2011 |
| WO | WO 200041971 | 7/2000 |
| WO | WO 2009086587 | 7/2009 |
| WO | WO 2013140848 | 9/2013 |
| WO | WO 2018148528 | 8/2018 |
| WO | WO 2018148542 | 8/2018 |
| WO | WO-2018148542 A1 * | 8/2018 .......... B01D 61/025 |

OTHER PUBLICATIONS

International Preliminary Report on Patentability from PCT/US2020/058567, dated May 12, 2022, 5 pages.

Ouchi et al., "Concept design for offshore dow plattorm as infrastructure of isolated island," Proceedings of the ASME 2011 30th International Conference on Ocean, Offshore and Arctic Engineering, OMAE 2011, Jun. 19-24, 2011, Rotterdam, The Netherlands, 5 pages.

Pacenti et al., Submarine seawater reverse osmosis desalination system, Desalination 126, pp. 213-218, Nov. 1999.

\* cited by examiner

THERMAL ENERGY CONVERSION SUBMERGED REVERSE OSMOSIS DESALINATION SYSTEM

CROSS-REFERENCE TO RELATED APPLICATIONS

The present application is a continuation under 35 U.S.C. § 111(a) of International Patent Application No. PCT/US2020/058567, filed on Nov. 2, 2020, which claims priority to U.S. Provisional Patent Application No. 62/929,564, filed on Nov. 1, 2019, the disclosures of which are incorporated by reference herein.

TECHNICAL FIELD

This invention relates to water desalination and offshore power production.

BACKGROUND ART

The growth of saltwater (e.g., seawater) desalination has been limited by the relatively high cost of desalinated water. This high cost is due in part to energy and capital expenses associated with current desalination systems. Such systems typically employ an onshore facility containing reverse osmosis (RO) desalination membranes contained in high-pressure corrosion-resistant housings and supplied with seawater from a submerged offshore intake system. Very high pressures typically are required to drive water through the RO membranes. For example, the widely-used FILMTEC™ SW30 family of reverse osmosis membrane elements (from DuPont Water Solutions) require about an 800 psi (55 bar) pressure differential across the membrane to meet design requirements. In addition to such high pressures, onshore RO units suffer from high power demands, primarily for pressurizing the feedwater to membrane operating pressures, and for an onshore RO unit these power demands typically average about 13.5 kWh per thousand gallons of produced fresh water. The seawater and the concentrated brine stream produced by a typical onshore RO unit have high corrosion potential and consequently require expensive components and equipment, including pressure vessels and conduits made from specialized alloys. The highly-pressurized water flow also increases maintenance expenses. Onshore RO units typically also require significant amounts of expensive seaside real estate. Shore-based desalination has in addition been criticized for various environmental impacts, including entrainment of marine life in the intake water, greenhouse gas production associated with producing the energy required, discharge of a strong brine stream with the potential to harm marine life, the use of treatment chemicals that may enter the ocean, and onshore land use that is often expensive and may harm local ecosystems. RO units include those described in U.S. Pat. No. 4,334,992 (Bonin et al.), U.S. Pat. No. 5,192,434 (Moller), U.S. Pat. No. 5,620,605 (Moller et al.), U.S. Pat. No. 5,788,858 (Acernase et al. '858), U.S. Pat. No. 5,972,216 (Acernase et al. '216), U.S. Pat. No. 8,282,823 B2 (Acernase et al. '823) and U.S. Pat. No. 9,227,159 B2 (DuFresne et al.), and U.S. Patent Application Publication No. US 2006/0065597 A1 (Kunczynski). In Kunczynski, an onshore, small scale RO system employs an energy recuperation assembly with a hydraulic motor that recovers energy from a pressurized brine stream and helps to drive a hydraulic pump that supplies salinated water under pressure to an RO cell.

In the 50 years since the invention of semi-permeable RO membranes, various concepts for submerging such membranes and employing natural hydrostatic water pressure to help desalinate seawater have been proposed. Representative examples include the systems shown in U.S. Pat. No. 3,171,808 (Todd), U.S. Pat. No. 3,456,802 (Cole), U.S. Pat. No. 4,125,463 (Chenowith), U.S. Pat. No. 5,229,005 (Fok et al.), U.S. Pat. No. 5,366,635 (Watkins), U.S. Pat. No. 5,914,041 (Chancellor '041), U.S. Pat. No. 5,944,999 (Chancellor '999), U.S. Pat. No. 5,980,751 (Chancellor '751), U.S. Pat. No. 6,149,393 (Chancellor '393), U.S. Pat. No. 6,348,148 B1 (Bosley) and U.S. Pat. No. 8,685,252 B2 (Vuong et al.); US Patent Application Publication Nos. US 2008/0190849 A1 (Vuong), US 2010/0270236 A1 (Scialdone) US 2010/0276369 A1 (Haag) and US 2018/0001263 A1 (Johnson et al.); GB Patent No. 2 068 774 A (Mesple); International Application Nos. WO 00/41971 A1 (Gu), WO 2009/086587 A1 (Haag Family Trust), WO 2018/148528 A1 (Bergstrom et al.), WO 2018/148542 A1 (Bergstrom) and Pacenti et al., *Submarine seawater reverse osmosis desalination system*, Desalination 126, pp. 213-18 (November, 1999).

Other water desalination technologies have also been proposed, including systems employing microfiltration, nanofiltration, ultrafiltration and aquaporins. These likewise have various drawbacks. In general, submerged water desalination systems do not appear to have been placed in widespread use, due in part to factors such as the energy cost of pumping the desalinated water to the surface from great depth and the difficulty of maintaining component parts at depth.

From the foregoing, it will be appreciated that what remains needed in the art is an improved system for water desalination featuring one or more of lower energy cost, lower capital cost, lower operating or maintenance cost or reduced environmental impact. Such systems are disclosed and claimed herein.

SUMMARY

Compared to land-based water separation, a submerged water separation system can provide several important advantages. For example, submerged operation can significantly reduce pump power requirements, since hydrostatic pressure can provide much or all of the driving force required for desalination, and only desalinated water will need to be pumped onshore. If conventional onshore power plants are relied upon for such power, then they may also emit undesirable greenhouse gases.

The disclosed invention provides in one aspect a submerged reverse osmosis (SRO) water desalination apparatus comprising:
  a. a plurality of reverse osmosis membrane elements that are submerged in cold salinated water and which produce from such salinated water:
     a. at least partially desalinated product water and
     b. concentrate or brine;
  b. a submerged first pump that receives such product water and sends it upward through a first conduit for surface or subsea use;
  c. a submerged second pump that receives such concentrate or brine and sends it upward through a second conduit to a closed-cycle or open-cycle Ocean Thermal Energy Conversion (OTEC) heat engine;
  d. an optional submerged third pump that receives additional salinated water and adds it to and dilutes concentrate or brine in the second conduit;

e. a submerged fourth pump that receives warm salinated water having a temperature greater than that of the cold salinated water and sends such warm salinated water to the OTEC heat engine;

the OTEC heat engine comprising:
a. a condenser cooled by the concentrate or brine;
b. a coupled turbine and generator that rotate to provide electrical power;
c. in a closed-cycle OTEC heat engine, an evaporator heated by the warm salinated water; a working fluid that evaporates to a vapor phase in the evaporator, the vaporized working fluid rotating the turbine and condensing to a liquid phase in the condenser; and a fifth pump that circulates the working fluid through a third conduit from the condenser to the evaporator to the turbine and back to the condenser; and in an open-cycle OTEC heat engine, an evaporator that vaporizes the warm salinated water, the vaporized water rotating the turbine and condensing to a liquid phase in the condenser;

wherein the OTEC heat engine provides electrical energy from the vaporized working fluid or vaporized water to at least partially drive one or more of the first through fifth pumps.

The disclosed invention provides in another aspect a method for operating a submerged reverse osmosis water desalination apparatus, the method comprising the steps of:
a. producing, from a plurality of reverse osmosis membrane elements that are submerged in cold salinated water:
   i. at least partially desalinated product water and
   ii. concentrate or brine;
b. pumping the product water through a submerged first pump and upward through a first conduit for surface or subsea use;
c. pumping the concentrate or brine through a submerged second pump upward through a second conduit to a closed or open-cycle OTEC heat engine;
d. optionally pumping additional salinated water through a submerged third pump for addition to and dilution of concentrate or brine in the second conduit;
e. pumping warm salinated water having a temperature greater than that of the cold salinated water through a submerged fourth pump and to the OTEC heat engine;
f. operating the OTEC heat engine to provide electrical energy, the OTEC heat engine comprising:
   i. a condenser cooled by the concentrate or brine,
   ii. a coupled turbine and generator that rotate to provide electrical power,
   iii. in a closed-cycle OTEC heat engine, an evaporator heated by the warm salinated water; a working fluid that evaporates to a vapor phase in the evaporator, the vaporized working fluid rotating the turbine and condensing to a liquid phase in the condenser; and a fifth pump that circulates the working fluid through a third conduit from the condenser to the evaporator to the turbine and back to the condenser; and in an open-cycle OTEC heat engine, an evaporator that vaporizes the warm salinated water, the vaporized water rotating the turbine and condensing to a liquid phase in the condenser;

wherein the OTEC heat engine provides electrical energy from the vaporized working fluid or vaporized water to at least partially drive one or more of the first through fifth pumps.

The above-mentioned WO 2018/148528 A1 (Bergstrom et al.) PCT application discloses the use of product water from an SRO apparatus for operating or improving the efficiency of OTEC systems, and for operating or improving the efficiency of Rankine Cycle heat engines. The available volume of such product water is however limited. The present invention instead operates an OTEC heat engine using the much greater thermal energy potential present in the large volume concentrate or brine stream obtained from an SRO apparatus. In addition, by operating the SRO apparatus at a deliberately low and normally non-preferred product water to brine recovery ratio, an even greater thermal advantage is obtained by using the concentrate or brine stream rather than the product water stream to cool an OTEC system.

The disclosed apparatus and method provide a submerged "Natural Ocean Well" that can provide desalinated water at reduced cost and with reduced power needs.

BRIEF DESCRIPTION OF THE DRAWING

Like reference symbols in the various figures of the drawing indicate like elements. The elements in the drawing are not to scale.

DETAILED DESCRIPTION

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, an apparatus that contains "a" reverse osmosis membrane includes "one or more" such membranes.

The term "airlift" when used with respect to a pump refers to a device or method for pumping a liquid or slurry by injecting air (and preferably only by injecting air) into the liquid or slurry.

The term "automatic" when used with respect to control of a submerged pump means that the control operates in the vicinity of and based on conditions in such pump, and without requiring the sending of signals to or the receipt of signals from a surface vessel, platform, or other non-submerged equipment.

The term "brine" refers to an aqueous solution containing a materially greater sodium chloride concentration than that found in typical saltwater, viz., salinity corresponding to greater than about 3.5% sodium chloride. It should be noted that different jurisdictions may apply differing definitions for the term "brine" or may set different limitations on saline discharges. For example, under current California regulations, discharges should not exceed a daily maximum of 2.0 parts per thousand (ppt) above natural background salinity measured no further than 100 meters horizontally from the discharge point. In other jurisdictions, salinity limits may for example be set at levels such as 1 ppt above ambient, 5% above ambient, or 40 ppt absolute.

The term "concentrate" refers to an RO apparatus discharge stream having an elevated salinity level compared to ambient surrounding seawater, but not necessarily containing sufficient salinity to qualify as brine in the applicable jurisdiction where such stream is produced.

The term "conduit" refers to a pipe or other hollow structure (e.g., a bore, channel, duct, hose, line, opening, passage, riser, tube or wellbore) through which a liquid flows during operation of an apparatus employing such conduit. A conduit may be but need not be circular in cross-section, and may for example have other cross-sectional shapes including oval or other round or rounded shapes, triangular, square, rectangular or other regular or irregular shapes. A conduit also may be but need not be linear or uniform along its length, and may for example have other shapes including tapered, coiled or branched (e.g., branches radiating outwardly from a central hub).

The term "depth" when used with respect to a submerged reverse osmosis apparatus or a component thereof refers to the vertical distance, viz., to the height of a water column, from the free surface of a body of water in which the apparatus or component is submerged to the point of seawater introduction into the apparatus or to the location of the component.

The terms "desalinated water", "fresh water" and "product water" refer to water containing less than 1000 parts per million (ppm), and more preferably less than 500 ppm, dissolved inorganic salts by weight. Exemplary such salts include sodium chloride, magnesium sulfate, potassium nitrate, and sodium bicarbonate.

The term "recovery ratio" when used with respect to an SRO system or SRO apparatus means the volumetric ratio of product water (permeate) produced by the system or apparatus to feedwater introduced to the system or apparatus.

The terms "saltwater" and "seawater" refer to water containing more than 0.5 ppt dissolved inorganic salts by weight, and thus encompassing both brackish water (water containing 0.5 to 3.0 ppt dissolved organic salts by weight) as well as water containing more than 3.0 ppt dissolved organic salts by weight. In oceans, dissolved inorganic salts typically are measured based on Total Dissolved Solids (TDS), and typically average about 35 ppt TDS, though local conditions may result in higher or lower levels of salinity.

The term "submerged" means underwater.

The term "submersible" means suitable for use and primarily used while submerged.

The term "wide area" when used with respect to dispersal of a fluid (e.g., concentrate or brine) away from a conduit having a plurality of fluid outlets (e.g., concentrate or brine outlets) distributed along a length of the conduit, means dispersal into an outfall area, and typically into a volume, encompassing at least 5 meters of such length. The disclosed area or volume will also have other dimensions (e.g., a width, diameter or height) that will depend in part upon the direction and velocities of fluid streams passing through the fluid outlets. Because such other dimensions will be affected by variable factors including fluid flow rates inside and outside the conduit, and the overall shape of the dispersed fluid plume, the term "wide area" has been defined by focusing merely on the recited length along the recited conduit, as such length typically will represent a fixed quantity in a given dispersal system.

Figure 1:
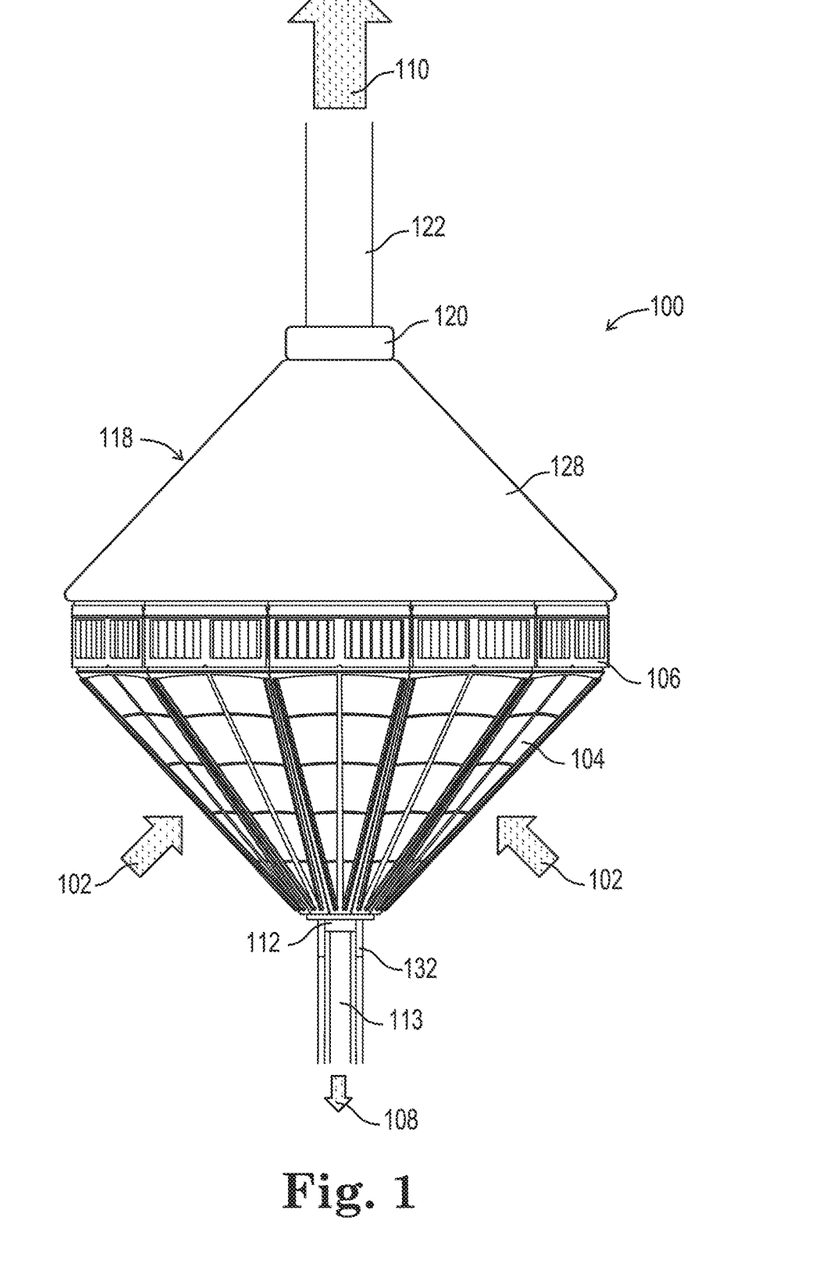
FIG. 1 and FIG. 2 are schematic side views of one embodiment of the disclosed apparatus.
Figure 2:
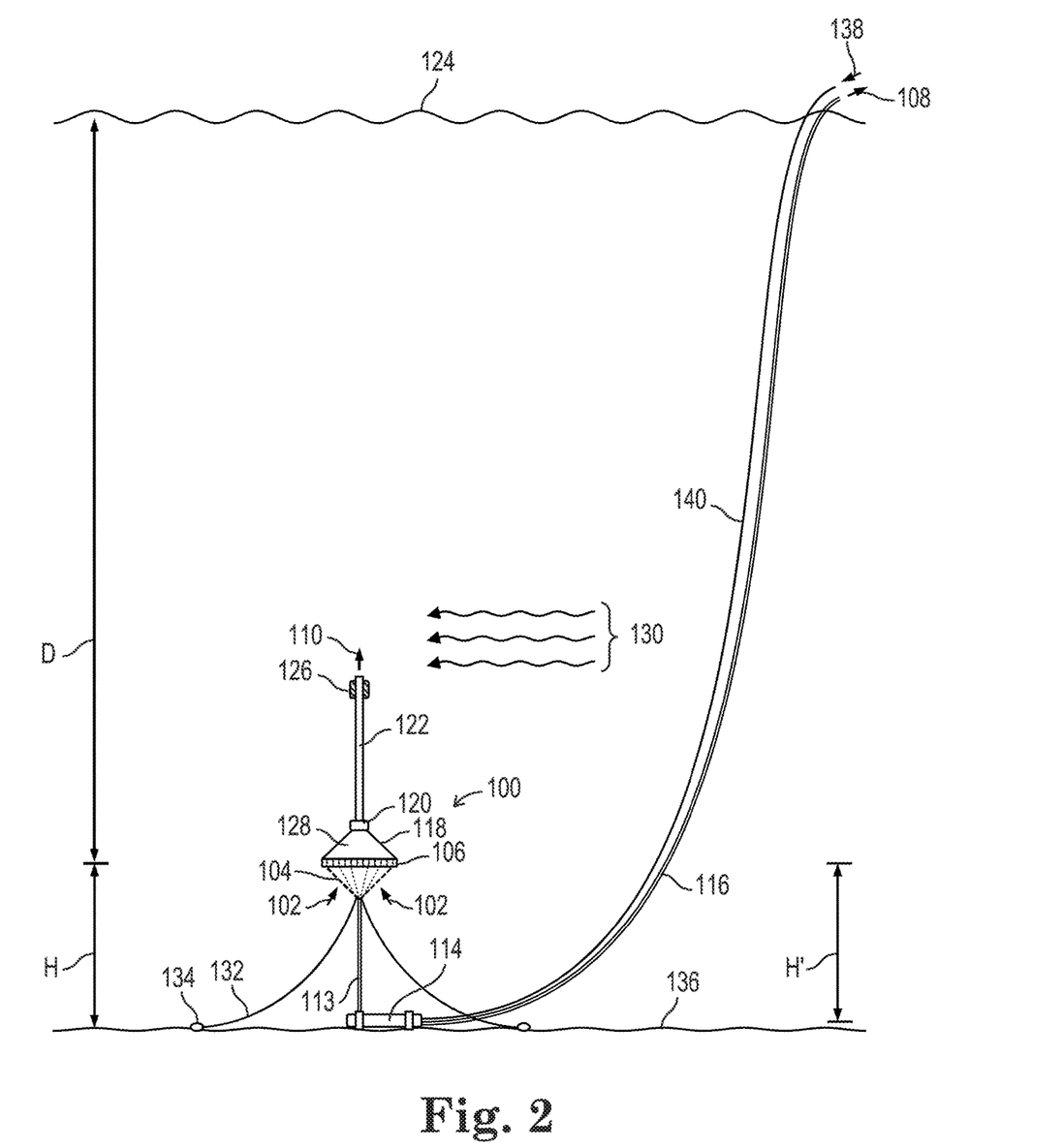

Referring first to FIG. 1 and FIG. 2, SRO apparatus 100 is shown in schematic side view. Raw seawater 102 enters apparatus 100 via prefilter screens 104, and is separated by RO membrane modules 106 into product water permeate stream 108 and concentrate or brine discharge stream 110. Permeate stream 108 passes into permeate collector 112 and thence through permeate conduit 113, submerged pump 114 and delivery conduit 116 to a ship-borne or onshore collection point (not shown in FIG. 1 or FIG. 2) for post-treatment, conveyance or storage for later use. Such uses may include municipal, private or industrial purposes including potable water, bathing water, irrigation water, process water, water storage, water table replenishment, cooling or heat exchange, and a variety of other purposes that will be apparent to persons having ordinary skill in the art. For example, potential cooling or heat exchange applications for such product water include providing or improving the efficiency of air conditioning systems including Sea Water Air Conditioning (SWAC) systems; providing or improving power plant or data center cooling; operating or improving the efficiency of OTEC systems (in addition to those discussed herein); and operating or improving the efficiency of Rankine Cycle heat engines (again, in addition to those discussed herein).

In the disclosed apparatus, raw seawater, product water and concentrate or brine may each flow in a variety of directions, e.g., upwardly, downwardly, horizontally, obliquely or any combination thereof. In the embodiment shown in FIG. 2, reverse osmosis membranes within membrane modules 106 are oriented so that concentrate or brine 110 is discharged generally upwardly from the modules 106 and is captured and collected by hood 118. Further details regarding such modules may be found in copending International Application No. PCT/US2020/058569 (International Publication No. WO 2021/087469 A1) filed Nov. 2, 2020 and entitled SUBMERGED WATER DESALINATION SYSTEM WITH REPLACEABLE DOCKABLE MEMBRANE MODULES, the disclosure of which is incorporated herein by reference. Axial pump 120 located at the lower end of riser 122 sends captured concentrate or brine 110 through riser 122 toward surface 124. Although the concentrate or brine may be used for a variety of purposes prior to discharge, in the present embodiment the diluted concentrate or brine has desirable volumetric and thermal utility and is used to operate an OTEC system and provide operating or surplus power, as discussed in more detail below.

In the embodiment shown in FIG. 2, buoyancy provided by a ring float 126 and a foam layer, e.g., an engineered syntactic foam layer (not shown in FIG. 2) located beneath the surface of hood 128, help maintain apparatus 100 at an appropriate depth D below surface 124. Catenary mooring lines 132 affixed to anchors 134 in seabed 136 help maintain apparatus 100 at an appropriate depth D below surface 124, an appropriate height H above seabed 136, and an appropriate height H' above the inlet to pump 114. Depth D preferably is such that the hydrostatic pressure of seawater at depth D is sufficient to drive seawater 102 through membrane modules 106 and produce product water 108 and concentrate or brine 110 at a desired overall volume and recovery ratio without the need for additional pumps or other measures to pressurize seawater 102 on the inlet side of membrane modules 106. The chosen depth D will vary based on several factors including the pressure drop across the above-mentioned prefilter screens 104; the type, dimensions and arrangement of RO cartridges within the membrane modules 106; the type, sizing and operating conditions of permeate collector 112, permeate conduit 113, product water pump 114 and product water conduit 116; and the type, sizing and operating conditions of pump 120 and riser 122. For example, if operating the disclosed SRO apparatus using HYDRANAUTICS™ SWC cylindrical membrane cartridges from Nitto Hydranautics operated without pumps to pressurize the inlet seawater, then operation at a depth of at least about 350 m together with a pump to draw product water from the membrane elements is preferred in order to minimize or eliminate the need for a high pressure vessel surrounding the membrane elements. In some prior SRO designs, especially those that rely on a pressure pump to force seawater through the membranes, thick pressure-resistant vessels are employed to contain the high pressures needed for membrane separation. In preferred embodiments of the present SRO desalination apparatus, the prefilter elements and RO membranes will not require pressure-resistant vessels, as they will already be immersed at a sufficiently high pressure in the fluid to be purified. Desirably the disclosed SRO apparatus merely maintains a sufficiently low pressure on the membrane product discharge side, and a sufficient inlet side-outlet side pressure differential, so as to allow proper membrane operation without the use of a surrounding pressure-resistant vessel.

Greater depths than those needed for operation without a pressure vessel (e.g., at least about 400, at least about 450, at least about 500, at least about 550, at least about 600, at least about 650, at least about 700, at least about 750, at least about 800, at least about 900 or at least about 1,000 m) may be employed if desired, with operation at such greater depths increasing the pump suction head and inlet pressure, and enabling use of the same model pump as might be employed at lesser depths. Such lesser depths may for example be at least about 300, at least about 200 or at least about 100 m, with operation at such lesser depths typically requiring at least one pump to help push seawater through the RO membranes (or a suitable vacuum assist on the outlet side) in order to achieve efficient desalination, and possibly also requiring a pressure vessel surrounding and protecting the membrane elements. Overall exemplary depths for operation of the disclosed SRO desalination system are for example from just below the surface (e.g., from about 10 m), from about 100 m, from about 300 m, or from about 500 m, and up to about 2,000 m, up to about 1,500 m or up to about 1,000 m. Depending on the chosen pump and membranes, preferred depths are from just below the surface to as much as 1500 m depth. Near the surface, the hydrostatic pressure of the ocean typically will need to be augmented by mechanical pumping to provide the trans-membrane pressure differential needed for reverse osmosis.

Depth D may moreover be a fixed depth chosen at the time of installation, or an adjustable depth that may for example be changed following SRO apparatus startup or changed in response to changing conditions (e.g., changing wave, tidal, thermocline or halocline conditions, changing seawater salinity, sea level rise, or changes in the operating efficiency of the RO membranes). In a further embodiment, the disclosed SRO apparatus may include a pressure-seeking capability to enable the system to increase or decrease its depth in order to obtain desired hydrostatic pressures, to optimize or adjust RO operating conditions or to optimize or adjust product water and concentrate or brine delivery.

By way of example, if the disclosed apparatus is operated at a depth of about 700 m, hydrostatic pressure will provide approximately 68 bar on the high-pressure side of the semi-permeable RO membrane. When used with a presently preferred backpressure of 13 bar or less on the product discharge side of the membrane, this will result in a pressure differential across the membrane of 55 bar (approximately 800 psi) or more. In situations of higher- or lower-salinity waters, these depth and pressure values may vary. The inlet pressure will in any event normally be the ocean hydrostatic pressure at the chosen SRO operating depth.

The preferred depth and pressure values set out above may vary in systems that take advantage of future membrane developments enabling or requiring lower or higher differential pressures or higher or lower membrane backpressures. Adjustments to accommodate such developments may increase or decrease the preferred operating depth for the disclosed SRO apparatus. For many membranes, the pressure on the low-pressure side typically will not change appreciably with depth, and consequently changing the depth of operation may suffice to adjust the differential pressure across the membrane and achieve optimal operating conditions.

The heights H (the vertical spacing between the lowest inlets to prefilter screens 104 and seabed 136) and H' (the vertical spacing between the membrane module 106 product water outlets and the inlet to pump 114) in FIG. 2 may for example each represent at least about 3, at least about 5, at least about 10, at least about 20, at least about 40 or at least about 50 m. Lesser heights H and H' may be employed. For example, height H may be reduced to near zero or zero, so that the inlets to prefilter screens 104 are near or at the same depth as seabed 136. However, doing so typically will increase the turbidity of seawater 102 entering modules 106 and the possibility that foreign matter may be drawn through prefilter screens 104 and into modules 106. Also, height H' between prefilter screens 104 and pump 114 may be reduced to near zero, zero or even less than zero (viz., by housing pump 114 inside the screened intake system between the prefilter screens 104 and the modules 106). In such reduced height H' embodiments the pump 114 and prefilter screens 104 preferably will however remain elevated at a sufficient distance above seabed 136 to avoid turbidity that may be present near seabed 136.

The depth of the disclosed apparatus 100, height H' and the diameter of the inlet to pump 114 are desirably sized to provide at least the net positive suction head (NPSH) or greater pressure (viz., the pressure caused by the height of the standing column of product water 108 in permeate conduit 113 and permeate collector 112 between membrane modules 106 and the inlet side of pump 114) sufficient to avoid inlet side cavitation upon startup and operation of pump 114. Further details regarding such cavitation avoidance during startup and operation may be found in copending International Application No. (WO 2021/087472 A1) filed Nov. 2, 2020 and entitled SUBMERGED WATER DESALINATION SYSTEM WITH REMOTE PUMP, the disclosure of which is incorporated herein by reference.

As depicted in FIG. 2, pump 114 rests upon and if desired may be moored to seabed 136 or to other natural or artificial structures on the seabed. Pump 114 may if desired be suspended above the seabed, for example in locations where the seabed is uneven or inclined. In one embodiment, pump 114 is suspended beneath the remainder of apparatus 100 by underwater mooring lines affixed to the apparatus and pump. Pump 114 may if desired be located in other locations, for example affixed to an offshore oil or gas platform, offshore wind farm support, bridge pier or other partly or wholly submerged supporting structure.

Pump 114 and the other pumps referred to herein may be selected from a wide variety of submersible single stage or multistage pumps, including piston (e.g., axial piston), plunger, rotary (e.g., centrifugal impeller pumps and rim-driven shaftless thrusters) and screw pumps that may use a variety of flow schemes including positive displacement, centrifugal and axial-flow principles. Suitable pumps are available from a variety of sources that will be familiar to persons having ordinary skill in the desalination art, and may in appropriate instances be adapted from other fields such as subsea oil and gas exploration, and marine (including submarine) positioning and propulsion. Exemplary pump suppliers include Brunvoll, Cat Pumps, Copenhagen Subsea, Enitech, FMC Kongsberg Subsea AS, Fuglesang Subsea AS, Halliburton, Hayward Tyler, Ocean Yacht Systems, Parker, Rolls Royce, Schlumberger, Schottel, Silent Dynamics, Technical Supply & Logistics, Vetus and Voith. In some embodiments the disclosed pumps include hot-swap connectors to enable them to be removed from the disclosed apparatus while it is submerged, for replacement, repair or rebuilding.

In some embodiments, pump 114 includes one or more sensors, controls or a torque limiting coupling (e.g., a magnetic clutch, hydraulic torque converter, combination thereof or other such device) between the electrical motor powering the pump and the pump impeller so as to limit or avoid inlet side cavitation and accompanying stress or other disturbance of the RO membranes during pump operation. Further details regarding cavitation avoidance during such operation may be found in copending International Application No. (WO01WO 2021/087470 A1) filed Nov. 2, 2020 and entitled SUBMERGED WATER DESALINATION SYSTEM WITH PRODUCT WATER PUMP CAVITATION PROTECTION, the disclosure of which is incorporated herein by reference.

In one embodiment, pump 114 diverts at least a portion of the product water 108 for use as a lubricating or cooling fluid directed through one or more of the pump, pump motor or the coupling between the motor and pump. Doing so can improve the pump longevity, while avoiding the need to use seawater, hydraulic fluid or other potentially corrosive or toxic fluids for lubrication or cooling. Further details regarding the use of product water for such lubrication and cooling may be found in copending International Application No. (WO01WO 2021/087471 A1) filed even date herewith Nov. 2, 2020 and entitled SUBMERGED WATER DESALINATION SYSTEM PUMP LUBRICATED WITH PRODUCT WATER, the disclosure of which is incorporated herein by reference.

Electrical power and appropriate control signals 138 may be supplied to pump 114 and other components of apparatus 100 through multi-conductor cable 140. The supplied electrical power operates pumps 114 and 120 and as needed other components in apparatus 100, such as a prefilter cleaning brush system. Further details regarding a desirable prefilter cleaning brush embodiment are discussed in more detail below.

When operated at sufficient depth, the RO membranes in apparatus 100 will not need to be encased in pressure vessels, and may instead be mounted in a lightweight supporting frame or other housing made from relatively inexpensive and suitably corrosion-resistant materials such as a corrosion-resistant metal skeleton or a housing made from a suitable plastic, fiber-reinforced (e.g., glass fiber- or carbon fiber-reinforced) plastic or other composite, or a variety of other unreinforced or engineered plastics the selection of which will be understood by persons having ordinary skill in the art. Avoiding the need for a pressure vessel greatly reduces the required capital expenditure (CAPEX) for constructing apparatus 100 compared to the costs for constructing a shore-based RO unit. If the RO membranes are individual units (for example, cartridges containing spiral-wound membranes), then avoidance of a pressure vessel also enables modules 106 to be economically designed using a parallel array containing a significantly larger number of cartridges than might normally be employed in a shore-based RO unit, and operating the individual cartridges at a lower than normal individual throughput. For example, the number of cartridges may be at least 10% more, at least 15% more, at least 20% more or at least 25% more than might normally be employed in an onshore RO unit. Doing so can help extend the life of individual membrane cartridges while still providing a desired daily amount of product water. In the embodiment shown in FIG. 1 and FIG. 2, and as discussed in more detail below, modules 106 preferably contain a large array of parallel cylindrical RO cartridges operated not only at such low individual throughput, but also with a reduced recovery rate. Doing so can also provide reduced concentrate salinity, reduced fouling potential, and in preferred embodiments will result in a large volume of concentrate that does not qualify as brine in the applicable jurisdiction, and which has substantial cold thermal energy potential for cooling an OTEC system. For example, permeate stream 108 is depicted in FIG. 1 as having a substantially smaller volume than brine discharge stream 110, corresponding to a low recovery ratio. Exemplary recovery ratios may for example be no greater than 40%, no greater than 30%, no greater than 20%, no greater than 15%, no greater than 10%, no greater than 8% or no greater than 6%, and may for example be less than 3%, at least 3%, at least 4% or at least 5%. The chosen recovery ratio will depend upon factors including the selected RO membranes, and the depth and applicable jurisdiction in which the SRO apparatus operates. The chosen recovery ratio also influences pump sizing and energy costs. By way of example, for an SRO embodiment employing Dow FILMTEC membrane cartridges to treat seawater with an average 34,000 ppm salinity at an 8% recovery ratio, about 8% of the seawater inlet stream will be converted to product water having less than 500 ppm salinity, and about 92% of the seawater inlet stream will be converted to a low pressure or unpressurized brine stream having about 37,000 ppm salinity. By way of a further example, an SRO apparatus employing Nitto Hydranautics membrane cartridges operated at a depth of about 500 m and a 5% recovery ratio may be used to produce concentrate that does not qualify as brine under the current version of the California Water Quality Control Plan.

In one preferred embodiment, the disclosed SRO apparatus operates at a depth of at least about 350 m, does not employ seawater pumps on the RO membrane inlet side, and employs a product (fresh) water pump on the outlet side of the RO membranes to maintain at least a 27 bar and more preferably at least a 30 or 35 bar pressure differential across the membranes, to allow the ocean's hydrostatic pressure to force or to largely help force product water through such membranes. Advantages for such a configuration include a pump requiring much less energy when located at the membrane outlet rather than at the inlet, and the avoidance of, or much lower requirements for, any pressure vessels housing the membranes. Use of membranes with a low required pressure differential will enable operation at lesser depths or using smaller pumps. Currently preferred such membranes include Nitto Hydranautics SWC6-LD membranes (40 bar differential pressure) and LG Chem LG-SW-400-ES membranes (38 bar differential pressure).

Figure 3:
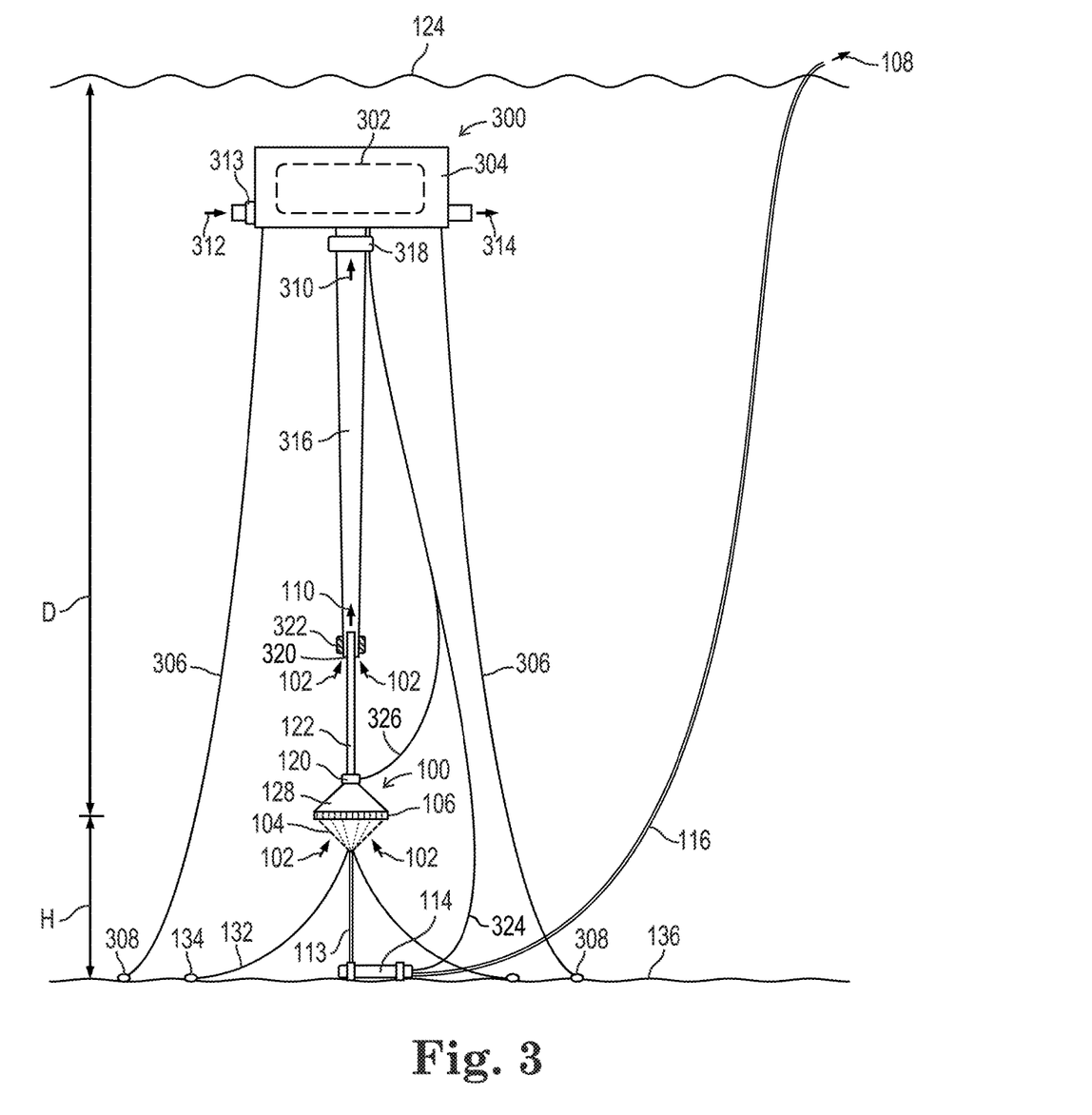
FIG. 3 and FIG. 4 are respectively side and schematic views of OTEC heat engine systems for supplying power to the disclosed apparatus.

Although the pumps in the disclosed apparatus may be supplied with power in a variety of ways, at least one and preferably all the pumps are powered by the disclosed OTEC system. Referring now to FIG. 3, closed-cycle OTEC unit 300 employs a recirculating Rankine cycle heat exchange and generator system 302 mounted on or within a submerged platform 304 whose location below surface level 124 provides desirable protection from wind and wave action. Platform 304 may be affixed to seabed 136 using catenary mooring lines 306 affixed to anchors 308. Platform 304 may if desired be otherwise fixed in place, for example to an offshore oil or gas platform, offshore wind farm support, bridge pier or other partly or wholly submerged supporting structure. Cold liquid stream 310 is introduced into system 302 by concentrate or brine pump 318 located at the upper end of riser 316. Stream 310 may if desired contain only concentrate or brine 110, but in the embodiment shown in FIG. 3 preferably is diluted by cold seawater 102 that enters the exposed lower end 320 of riser 316 beneath ring float 322. Doing so desirably decreases the salinity and increases the cold thermal energy potential of stream 310. Warm liquid stream 312 is obtained from shallow depth seawater near platform 304, and is pumped into system 302 by OTEC warm seawater pump 313. Warm liquid stream 312 may be screened, filtered or otherwise pretreated (e.g., with a biocide) to reduce entrainment of marine life and biofouling. In another embodiment that may be available at select locations, warm liquid stream 312 is obtained by capturing the output from an undersea thermal vent.

System 302 employs thermal energy extracted from the temperature differential between cold liquid stream 310 and warm liquid stream 312 to provide electrical power for operation of electrically-driven components in the disclosed SRO apparatus. Following utilization of such thermal energy, streams 310 and 312 may be separately discharged, but in the embodiment shown in FIG. 3 preferably are mixed to form wide area dispersal stream 314. Doing so helps further reduce the salinity of stream 314.

Figure 4:
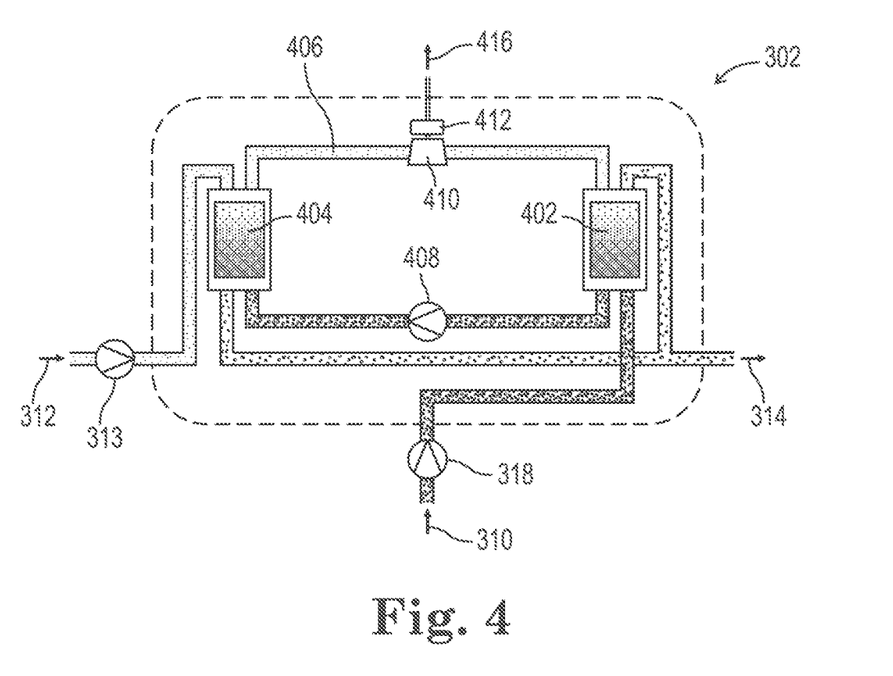

FIG. 4 shows a schematic view of the disclosed closed-cycle OTEC system 302. Cold stream 310 and warm stream 312 are respectively used by system 302 to repeatedly liquefy (in condenser 402) and volatilize (in evaporator 404) a volatile circulating working fluid 406 such as ammonia or a hydrofluorocarbon circulated by OTEC working fluid pump 408. Warm stream 312 and cold stream 310 preferably have a temperature differential, as measured upon their arrival at system 302, of at least 18° C., at least 20° C., at least 22° C., at least 24° C. or at least 26° C. Based on current ocean temperature conditions, preferred such temperature differentials are generally found in offshore locations between the Tropic of Cancer to the north of the equator and the Tropic of Capricorn to the south. Somewhat reduced temperature differentials may be found at numerically higher northern or southern latitudes, as well as in the tropical latitude offshore regions lying just to the west of Africa and South America.

The differing thermal energy potentials of cold stream 310 and warm stream 312 enable working fluid 406 to repeatedly change from a vapor phase to a liquid phase and back to a vapor phase while circulating through condenser 402, working fluid pump 408 and evaporator 404, with the volume expansion caused by vaporization serving to drive turbine 410 and its coupled electrical generator 412. A portion of the electrical output 416 from generator 412 may be used to drive pump 408. Another portion of electrical output 416 may be used to drive pumps 114 and 120 using power respectively supplied via electrical cables 324 and 326 shown in FIG. 3. Another portion of electrical output 416 may be used to drive other submerged pumps such as pumps 313 and 318. Any remaining electrical output may be used for other purposes in connection with operating, monitoring or maintaining the SRO apparatus, or used externally (e.g., onshore).

Referring again to FIG. 3, pumps 120 and 318 promote inflow and mixing of cold seawater 102 into the exposed lower open end 320 of riser 316 and the formation of diluted cold concentrate or brine stream 310. Stream 310 has generally reduced salinity compared to concentrate or brine 110 and thus presents a reduced potential hazard to marine life. Stream 310 also has substantially greater volume and substantially greater cold thermal energy potential (e.g., for the above-mentioned SRO apparatus based on Dow FILMTEC membranes, about 11.5 times the volume and about 11.5 times the cold thermal energy potential) than would be available if an SRO product water stream was instead employed to cool the OTEC system. Accordingly, using a cold brine or concentrate stream (and especially using a low recovery ratio concentrate stream that is further diluted with cold seawater) for OTEC cooling can provide a significant improvement in overall OTEC energy efficiency compared to an RO system using cold product water for OTEC cooling. Doing so can also help reduce both CAPEX requirements and operating expenses. In particular, when the RO membranes are operated at deliberately lower recovery ratios than might be used in a shore-based system, the concentrate volume can become very large relative to the product water volume (e.g., up to 10-20 times the permeate volume at 5-10% recovery), thereby greatly facilitating the extraction of useful energy via OTEC system 302. In preferred embodiments the disclosed Ocean Well+OTEC system consequently can be optimized to provide both a 100% self-powered seawater desalination system as well as surplus power for a variety of uses. For example, system 302 may be sized to provide surplus electrical power to operate warning beacons, monitoring equipment, telemetry devices, ROVs and other electrical devices used in or with the disclosed SRO apparatus. In additional preferred embodiments, system 302 is sized to provide further additional electrical power for use in other nearby SRO units or for onshore delivery via suitable cabling for private or public onshore use.

Combining OTEC power generation with the use of and discharge of diluted concentrate accomplishes particularly important goals, including (1) transport of concentrate or brine 110 to an OTEC system located at or near the surface 124 moves the concentrate or brine 110 far away from both the disclosed SRO apparatus seawater intake and the ocean floor 136, where a buildup of salinity would be detrimental to the desalination process and the benthic environment, respectively; and (2) mixing cold seawater 102 and warm seawater 312 with concentrate or brine 110 can dilute the concentrate or brine 110 to negligible levels of elevated salinity, such that dispersal stream 314 may, depending on the jurisdiction, not be classified as "brine". In any event, stream 314 may be controlled to pose little environmental threat. If desired, dispersal stream 314 may also or instead be pumped from system 302 using an airlift pump as discussed in the above-mentioned International Application WO 2018/148542 A1 (Bergstrom). Doing so can help oxygenate the dispersal stream, thereby promoting increased oxygenation of nearby seawater and a reduction in hypoxia.

As also depicted in FIG. 3, riser 316 preferably has a generally conical shape, with a narrow lower end proximate the top of riser 122 and a wide upper end proximate the base of platform 304. This shape helps maintain a sizable diameter water flow path through riser 316 despite bending or other constriction in riser 316 that may be caused by lateral or other movement of apparatus 100 and platform 304 relative to one another. The disclosed generally conical shape can also help reduce pipe friction near platform 304

(where there may be the most lateral motion) and can help reduce material stress distributions throughout riser 316 that may result from such motion. Riser 316 may be rigid or flexible and may be made from a variety of materials including insulated or uninsulated seawater-resistant fabric, textile, polymeric or composite material. Riser 316 preferably is both flexible and insulated and more preferably is made from an insulated and imperviously-coated flexible textile laminate. In one embodiment, riser 316 is also slidably mounted with respect to riser 122, thereby compensating for vertical movement (e.g., as may be caused by waves notwithstanding the retaining forces applied by mooring lines 306) of platform 304.

In an additional embodiment (not shown in FIG. 3), system 300 may employ one or more added devices to increase the warm-side stream 312 intake temperature, such as a suitably large floating or otherwise permanently or temporarily-exposed solar absorbing heat exchanger or solar pond whose color, texture, and geometry are tuned to absorb greater solar energy than would be absorbed by seawater occupying the same area.

As an alternative to the embodiment shown in FIG. 3, OTEC unit 300 may if desired be placed on a floating or fixed exposed platform located at or above surface 124. As shown for example in FIG. 5, sea level platform 500 may be anchored as described above or otherwise maintained at sea level. In some embodiments, the depth of platform 500 may be adjusted as needed to account for changing wave heights, tides or projected sea level changes. Moving or other replaceable parts on platform 500 desirably will be located mainly at depths readily reachable by human divers, e.g., at depths less than about 100 meters, less than about 60 meters, less than about 50 meters or less than about 30 meters. One or more auxiliary or alternative power sources on platform 500 such as underwater (viz., tidal) turbines 502, other conventional turbines (not shown in FIG. 5), wave energy generator 504, solar panels 506 or wind turbine generator 508 may be used to operate or help operate OTEC unit 300, or may be used to independently operate submerged pumps and other electrical components in the disclosed SRO apparatus. Suitable underwater turbines include those available from Nova Innovation. Suitable wave energy generators include those available from CalWave Power Technologies, Inc. Suitable solar panels include both platform-mounted and floating designs such as those available from Kyocera Corporation. Suitable wind turbine generators include those available from Principle Power, Inc.

If desired, an open-cycle OTEC system may be used in place of a closed-cycle OTEC system. In an open-cycle system, the warm seawater is converted to vapor using a suitable evaporator. The vapor drives a turbine before being condensed to freshwater by the cold concentrate or brine stream. The condensed freshwater may be combined with product water from the ocean well to provide additional freshwater production. An open-cycle system avoids the need for a circulating working fluid and the associated circulation pump. Also, it generally is not necessary to employ screens, filtration or a biocide on the warm water side of the system, as the evaporation process normally is sufficient to prevent biofouling. A hybrid cycle OTEC system that combines features of both open and closed-cycle systems may also be employed. In general however, a closed-cycle OTEC system will be preferred for most applications.

Apparatus 100 may if desired be additionally supplied with power from a conventional platform-mounted, shipborne or onshore power source, for example an onshore power plant. Doing so may result in greater carbon emissions than when using the power supply systems disclosed in FIG. 3 through FIG. 5, but may be desirable in instances in which the disclosed OTEC system and the disclosed auxiliary or alternative power sources on platform 500 are not able to provide sufficient power or are not able to do so at all times or seasons when such power may be needed.

Figure 5:
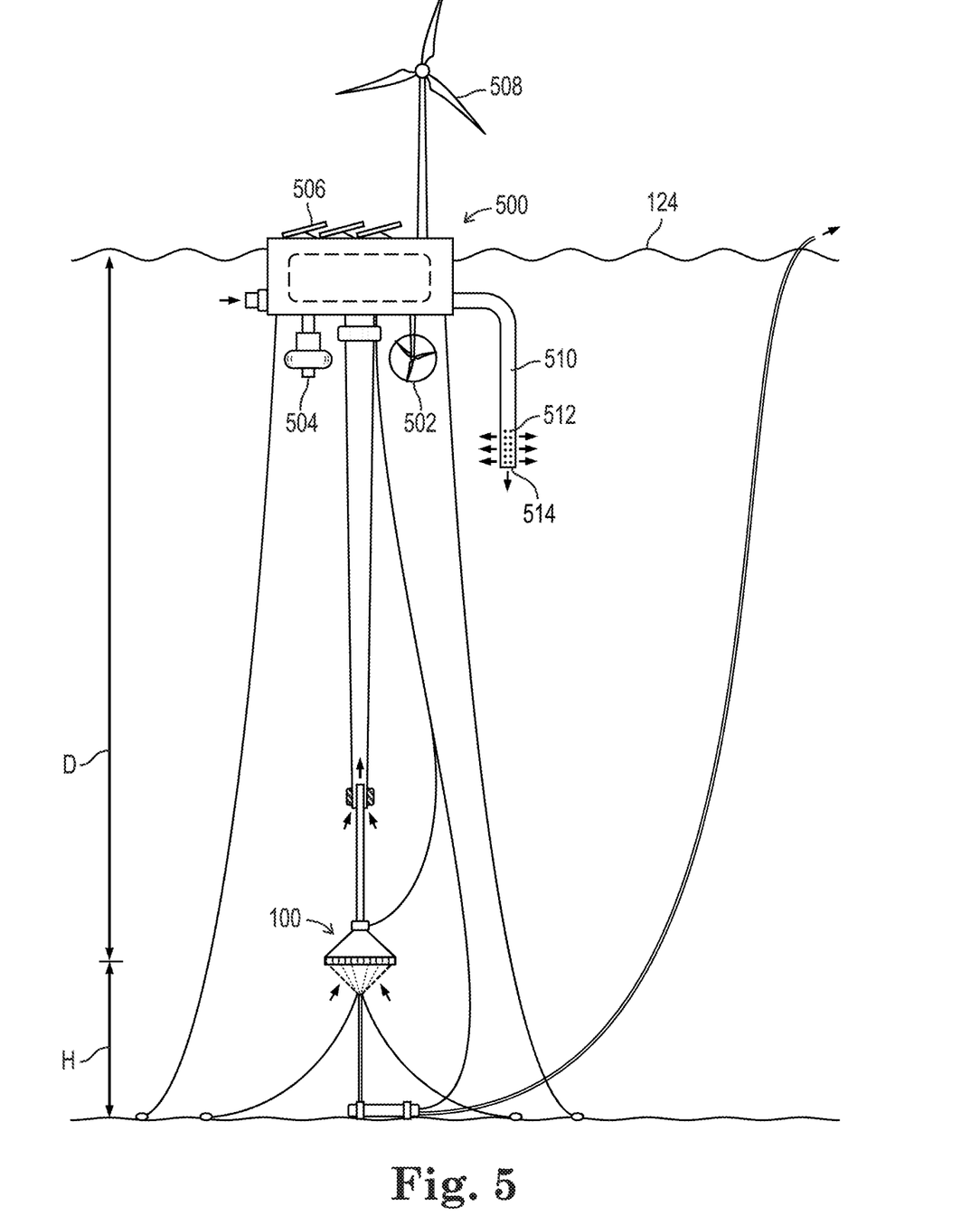
FIG. 5 is a side view of alternate systems for supplying power to the disclosed apparatus, and for disposing of concentrate or brine with reduced greenhouse gas emissions.

As also shown in FIG. 5, discharge conduit 510 may be used to transport concentrate or brine exiting the disclosed OTEC system away from the OTEC system for release into the surrounding water. The overall direction for such transport may be horizontal, upward, or (as shown in FIG. 5) downward with respect to the OTEC system. In a preferred embodiment, the effluent from conduit 510 is a reduced salinity blended effluent made by combining the disclosed cold concentrate or brine stream and warm water stream after these respective streams have passed through the OTEC system and their desired thermal energy potentials have been extracted. In a further preferred embodiment, a significant part (e.g., at least 20%, at least 30%, at least 40% or at least 50%) of the effluent in conduit 510 exits the conduit via a series of side orifices 512 arrayed along the terminal end of conduit 510, and the remaining effluent exits via end orifice 514. In a further preferred embodiment, the effluent from conduit 510 is discharged into a water column at a depth at which the surrounding seawater density exceeds that of the effluent (e.g., the blended effluent), thereby reducing atmospheric release of carbon dioxide compared to discharge at a lesser depth.

Figure 6:
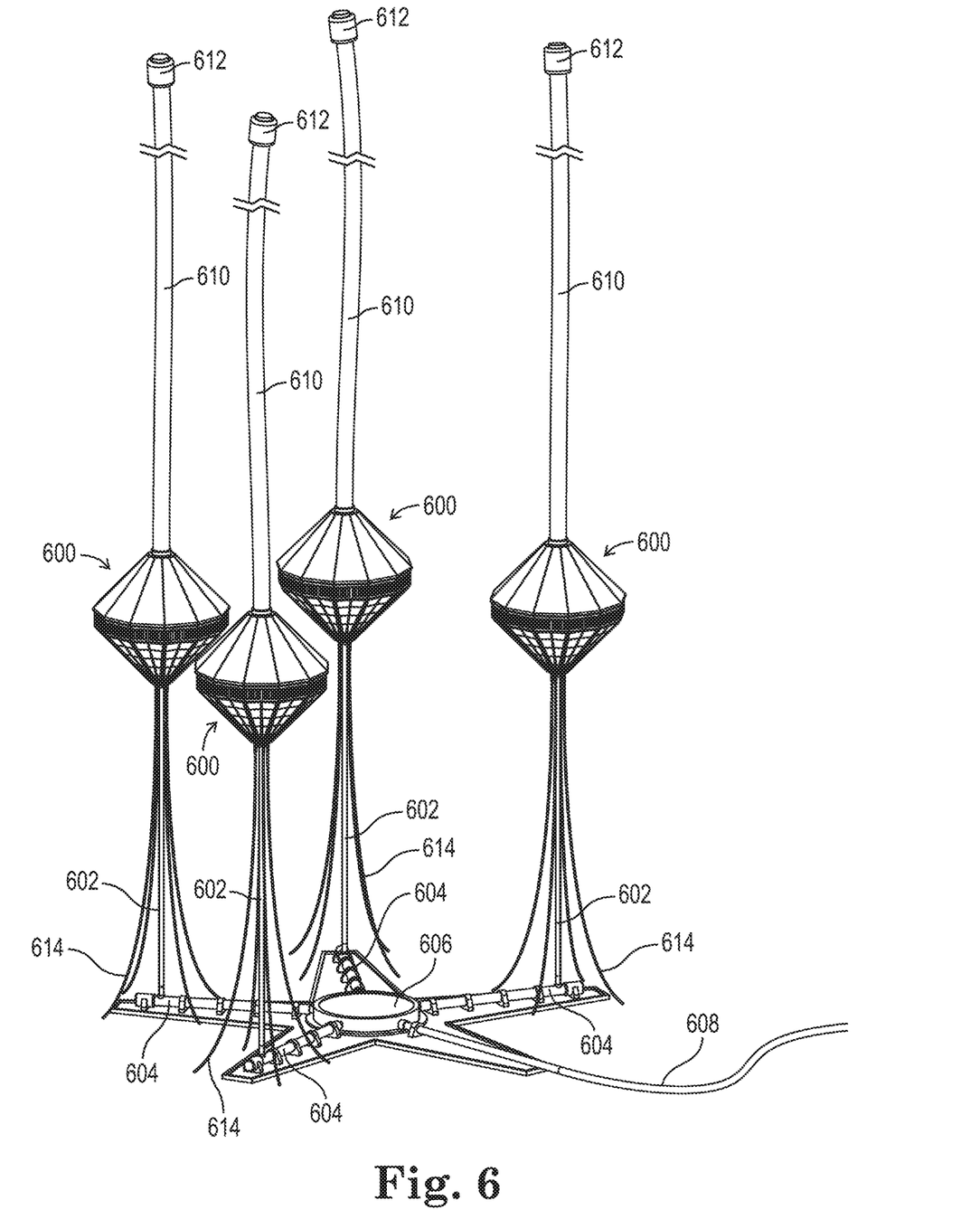
FIG. 6 is a perspective view of a water farm formed by a connected array of the disclosed SRO systems.

Referring to FIG. 6, a "water farm" containing an array of portable offshore desalination systems ("pods") 600 is shown in perspective view. Product water flows downwardly from the modules 600 through conduits 602 and horizontally through pumps 604 to a centrally located hub 606, and is then pumped towards the surface through delivery conduit 608. Concentrate or brine is pumped upwardly through conduits 610 into ocean currents for dispersal away from the pods 600 or for use in an OTEC system like that discussed above. The conduits 610 may if desired be kept separate from one another, bundled together, or connected to a single larger diameter conduit, and may if desired by equipped with hot-swap water connectors (not shown in FIG. 6) to facilitate disconnection, maintenance or replacement of individual pods 600.

As depicted in FIG. 6, four pods 600 are employed. However, lesser or greater numbers of pods can be used if desired, for example 2, 3, 5, 6, 7, 8, 10, 20 or more pods. Using a plurality of connected pods provides redundancy and enables ready scaleup of the disclosed SRO apparatus to meet initial or growing water needs. Operation and maintenance of the disclosed apparatus can be facilitated by providing a plurality of hot-swap water connectors (not shown in FIG. 6) between each conduit 602 and its associated pump 604, or between each pump 604 and hub 606, or at both the inlet and outlet ends of each pump 604. Scaleup of the disclosed apparatus can be facilitated by providing one or more additional hot-swap water connectors (not shown in FIG. 6) on hub 606 or at another convenient location to enable connection of additional pods or water farm arrays to delivery conduit 608 at a later date. If for example the individual pods 600 shown in FIG. 6 each have a 5 million gallons per day product water capacity, and if five additional hot-swap connectors are included in hub 606, then the FIG. 6 water farm could provide 20 million gallons of product water per day as initially installed, and up to five additional similarly-sized pods 600 could be added in 5 million gallons per day increments to provide up to 45 million total gallons of product water per day. In another embodiment, a plurality of such arrays may be installed near one another to provide multiple instances of the 20 million gallon per day array shown in FIG. 6, thereby providing increased capacity, redundancy and multiplicity of scale for the individual components. In yet another embodiment, the pods are not grouped together as depicted in FIG. 6, and instead are spaced apart across the seafloor, for example to accommodate topographical changes in the seafloor landscape, mooring line locations or other subsea features.

Using 140 of the above-mentioned Hydranautics cartridges in each module, the disclosed SRO apparatus may produce about 5 million gallons per day from a twelve such modules operated at a 5% recovery rate. Other RO membrane suppliers whose cartridges may be used will be apparent to persons having ordinary skill in the art, and include Aquatech International, Axeon Water Technologies, DuPont Water Solutions (makers of the above-mentioned DOW FILMTEC cartridges), Evoqua Water Technologies, GE Water and Process Technologies, Koch Membrane Systems, Inc. and LG Chem. Customized cartridges having altered features (for example, wider gaps between layers, modified spacers, a looser membrane roll, a modified housing or modified ends) may be employed if desired.

In an embodiment, the RO cartridges are mounted in the disclosed modules by adhesively bonding and sealing the cartridges in holes in a perforated divider plate. Further details regarding adhesively mounting such cartridges may be found in copending International Application No. (WO01WO 2021/087473) filed Nov. 2, 2020 and entitled ADHESIVELY-BONDED WATER SEPARATION CARTRIDGE MODULE, the disclosure of which is incorporated herein by reference.

The disclosed SRO desalination apparatus may be operated in a variety of locations. In one preferred embodiment, the apparatus is deployed in an ocean trench or dropoff (for example, the Monterey Submarine Canyon, Puerto Rico Trench, Ryukyu Trench, waters surrounding the Hawaiian Islands, and other accessible deep sea sites that will be familiar to persons having ordinary skill in the art), near a populated area in need of desalinated water. The SRO inlet surfaces need not be placed at trench floor depth, and may instead be positioned along the trench wall at a depth sufficient to enable the use of hydrostatic pressure to drive seawater through the osmotic membranes.

Operation at appropriate depths can greatly reduce or eliminate the likelihood of algal bloom contamination, which can cause conventional shore-based plants with shallow water intakes to shut down in order to avoid toxins and clogging. Operation at such appropriate depths can also minimize or eliminate the loss of marine life, as most marine organisms are found within the photic zone (depending upon water clarity, corresponding to depths up to about 200 m) and thus at deeper depths will not be drawn into the SRO apparatus intake or against a prefilter screen.

The cold feedwater (e.g., 5-10° C. water) typically encountered at the above-mentioned recommended SRO operating depths can provide several useful advantages. For example, the feedwater is relatively free from critical organic and inorganic contaminants. It carries very little organic matter or chlorophyll and thus contains little bacteria, while still retaining valuable nutrients from the ionic minerals and trace elements present at the disclosed pressures and depths. A further advantage arises in connection with boron removal, which is important for irrigation water and health purposes. Boron is present in seawater, and at conventional RO operating temperatures such as are used in onshore RO units, enough boron may pass through the RO membrane to inhibit the growth of plants. Boron removal to agricultural standards of 0.5 mg/liter in a conventional RO facility may require double treatment of the water using a second RO pass, thus increasing capital and operating costs. Boron removal by reverse osmosis is however highly temperature-dependent, with lower amounts of boron and its salts passing through the membranes at colder temperatures. For example, borate passage may be reduced by several percentage points for every reduction of 10° C. in feedwater temperature. Placement of the disclosed SRO device in cold deep water consequently may help produce higher-quality desalinated water by improving the removal of boron and its salts while saving the energy, capital, and maintenance costs required for a double treatment system. Cold feedwater can also result in less overall salt passage through the membrane, allowing for remineralization of the product water for taste reasons while maintaining a low level of TDS to meet regulatory requirements. In addition, the use of cold feedwater can nearly eliminate the scaling of membranes by mineral deposition, as measured by the Langelier Index. Membrane scaling can be a problem with shore-based, shallow-intake RO units, and reduces system efficiency and lifetime. In the disclosed SRO apparatus, scaling is minimized because $CO_2$ will tend to be in equilibrium at the 5-10° C. temperatures at which the RO membranes may be operating. This can eliminate the need for the anti-scaling chemicals that often are employed in shore-based RO units. Biofilm growth, another form of membrane fouling, is also temperature-dependent, with more biofilm forming at warmer temperatures, and less at the low-temperature preferred operating environment of the disclosed SRO apparatus. Biological activity and hence biological fouling are thus reduced due to the use of water from a region having no light, low oxygen, and cold water temperatures.

The disclosed SRO apparatus can produce significantly lower concentrations of salt in the brine stream than will be the case for conventional RO, as the elimination of the requirement for pressure vessels permits the RO membranes to be arrayed in parallel rather than the typical seawater desalination industry practice of 5-7 membranes in a serial arrangement. A parallel array eliminates a common failure point in conventional RO systems, namely the o-ring interconnections between membranes. A parallel arrangement also permits higher product water production per membrane. In addition, a parallel membrane arrangement creates much less salty concentrate or brine than a train of single membranes operating in series, and the salinity of such concentrate or brine can easily be adjusted by altering the membrane recovery ratio. The ability of the disclosed SRO apparatus to achieve low brine salinity is beneficial to sea life and allows easier dilution of the concentrate or brine. For example, when supplied with Southern California seawater containing about 34,250 ppm ambient TDS and operated at a 5% recovery ratio, the disclosed apparatus may provide concentrate containing only about 36,049 TDS versus the near-doubling in discharge stream salinity that may arise using conventional serially-configured onshore RO. A 36,049 ppm TDS discharge stream would be less than 1800 ppm above ambient, and thus well within the current brine discharge limit of 2,000 ppm above ambient TDS for California waters.

A principal benefit of the overall disclosed SRO apparatus is its significantly reduced energy requirements. The artificial pressurization of process water, the largest source of energy use in conventional RO desalination, can be reduced or eliminated. The energy consumption and associated greenhouse gas production to produce desalinated water using the disclosed SRO-OTEC apparatus may also be significantly reduced. The associated capital expenditures and operating expenditures can likewise also be significantly reduced, especially in comparison with those required for onshore RO desalination. These and other advantages of the disclosed SRO apparatus thus may include one or more of:

Greatly reduced power consumption.

Reduced greenhouse gas emissions to desalinate a given quantity of water.

Elimination of the artificial high-pressure environment used in conventional RO and the accompanying pressure vessels, high pressure piping, and fittings.

Reduced operation and maintenance requirements through elimination of parts, and especially the reduction of highly-pressurized connections.

Fewer precision parts requiring expensive alloys and other exotic materials resistant to seawater corrosion.

Reduced or eliminated pretreatment equipment and its associated operating capital and labor.

Reduced localized brine emission.

Parallel rather than series membrane configurations with even lower-salinity brine discharge.

Pipelines to shore that are over 50% smaller in diameter, as only product water is sent onshore, subject however to increased required length.

Reduced boron content in desalinated water, making it suitable for agriculture without further treatment.

Reduced bacterial content and bacterial fouling due to the use of deep-sea intake water that is relatively free of undesirable organic or inorganic contaminants.

Reduced susceptibility to desalination disruption caused by algal blooms.

Reduced visibility or invisibility from shore.

Reduced susceptibility to destruction due to adverse weather events, fires, terrorism or volcanic eruptions.

Reductions by as much as 90% in required onshore real estate.

Suitability for deployment as an "Ocean Well" that can provide a sustained freshwater supply without aquifer depletion.

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

The invention claimed is:

1. A submerged reverse osmosis water desalination apparatus comprising:
  a. a plurality of reverse osmosis membrane elements that are submerged in cold salinated water and which produce from such salinated water:
    i) at least partially desalinated product water and
    ii) cold concentrate or brine;
  b. a submerged first pump that receives such product water and sends it upward through a first conduit for surface or subsea use;
  C. a submerged second pump that receives such cold concentrate or brine and sends it upward through a second conduit to a closed-cycle or open-cycle Ocean Thermal Energy Conversion (OTEC) heat engine; and
  d. a third pump that receives warm salinated water having a temperature greater than that of the cold salinated water and sends such warm salinated water to the OTEC heat engine;
  the OTEC heat engine comprising:
    a. a condenser cooled by the cold concentrate or brine;
    b. a coupled turbine and generator that rotate to provide electrical power;
    c. in a closed-cycle OTEC heat engine, an evaporator heated by the warm salinated water; a working fluid that evaporates to a vapor phase in the evaporator, the vaporized working fluid rotating the turbine and condensing to a liquid phase in the condenser; and a fourth pump that circulates the working fluid through a third conduit from the condenser to the evaporator to the turbine and back to the condenser; and in an open-cycle OTEC heat engine, an evaporator that vaporizes the warm salinated water, the vaporized water rotating the turbine and condensing to a liquid phase in the condenser;
  wherein the OTEC heat engine provides electrical energy from the vaporized working fluid or vaporized water to at least partially drive one or more of the first through fourth pumps.

2. An apparatus according to claim 1, wherein the first and second pumps are sized to operate the reverse osmosis membrane elements at a recovery ratio of product water volume to feedwater volume that is no greater than 40%.

3. An apparatus according to claim 1, wherein the first and second pumps are sized to operate the reverse osmosis membrane elements at a recovery ratio of product water volume to feedwater volume that is no greater than 30%.

4. An apparatus according to claim 1, wherein the first and second pumps are sized to operate the reverse osmosis membrane elements at a recovery ratio of product water volume to feedwater volume that is no greater than 20%.

5. An apparatus according to claim 1, wherein the first and second pumps are sized to operate the reverse osmosis membrane elements at a recovery ratio of product water volume to feedwater volume that is at least 3%.

6. An apparatus according to claim 1, wherein the second conduit has one or more inlets that allow entry of salinated water and dilution of the concentrate or brine.

7. An apparatus according to claim 1, further comprising a fifth pump that receives additional salinated water and adds it to and dilutes cold concentrate or brine in the second conduit.

8. An apparatus according to claim 1, wherein the second conduit is rigid.

9. An apparatus according to claim 1, wherein the second conduit is flexible and comprises insulated or uninsulated seawater-resistant fabric, textile, polymeric or composite material.

10. An apparatus according to claim 1, wherein the second conduit comprises an insulation layer that reduces warming of cold concentrate or brine transported through the second conduit.

11. An apparatus according to claim 1, wherein the second conduit comprises an insulated and imperviously-coated flexible textile laminate.

12. An apparatus according to claim 1, wherein the second conduit is slidably extendable along its length.

13. An apparatus according to claim 1, wherein the second conduit has an enlarged diameter near the OTEC heat engine to discourage bending or other constriction if the OTEC heat engine moves laterally with respect to the second conduit.

14. An apparatus according to claim 1, wherein concentrate or brine from the condenser and salinated water from the evaporator are separately dispersed into seawater surrounding the OTEC heat engine.

15. An apparatus according to claim 1, wherein the apparatus combines concentrate or brine from the condenser and salinated water from the evaporator after the concentrate or brine and salinated water have passed through the OTEC heat engine, and disperses the resulting reduced salinity blended effluent through a fourth conduit into seawater surrounding the OTEC heat engine.

16. An apparatus according to claim 15, wherein the fourth conduit discharges the reduced salinity blended effluent into a water column at a depth at which the surrounding seawater density exceeds that of the blended effluent, thereby reducing atmospheric release of carbon compared to discharge at a lesser depth.

17. An apparatus according to claim 1, wherein concentrate or brine from the condenser flows through a fourth conduit having a plurality of orifices located along at least a portion of the length of the fourth conduit, and the orifices direct concentrate or brine into seawater away from the fourth conduit for wide area dispersal of the concentrate or brine into seawater surrounding the OTEC heat engine.

18. An apparatus according to claim 1, further comprising airlift to assist in transporting and oxygenating the concentrate or brine through the second conduit, and if present through the fourth conduit.

19. An apparatus according to claim 1, further comprising a device that increases the temperature of warm salinated water received by the fourth pump.

20. An apparatus according to claim 19, wherein the device comprises a floating or otherwise permanently or temporarily-exposed solar absorbing heat exchanger or solar pond whose color, texture, and geometry are tuned to absorb greater solar energy than would be absorbed by seawater occupying the same area.

21. An apparatus according to claim 1, wherein the OTEC heat engine employs a single-stage heat engine.

22. An apparatus according to claim 1, wherein the OTEC heat engine employs a multi-stage heat engine.

23. An apparatus according to claim 1, wherein the OTEC heat engine comprises a closed-cycle heat engine.

24. An apparatus according to claim 1, wherein the OTEC heat engine comprises an open-cycle heat engine wherein warm salinated water vaporizes in the evaporator, rotates the turbine and forms desalinated water in the condenser.

25. An apparatus according to claim 1, wherein the OTEC heat engine is a closed cycle heat engine with ammonia or a hydrofluorocarbon as working fluid.

26. An apparatus according to claim 1, wherein the desalinated water from the condenser provides additional product water.

27. An apparatus according to claim 1, wherein the OTEC heat engine supplies all electrical power required to operate the pumps and other electrically-powered components of the desalination apparatus.

28. An apparatus according to claim 1, wherein the OTEC heat engine provides excess power for surface, subsea or other use.

29. An apparatus according to claim 1, wherein the apparatus is deployed in seawater near a populated area in need of desalinated water, the apparatus relies wholly upon the OTEC heat engine for power to drive pumps in the apparatus, and excess power from the OTEC heat engine is provided to the populated area.

30. A method for operating a submerged reverse osmosis water desalination apparatus, the method comprising the steps of
 a. producing, from a plurality of reverse osmosis membrane elements that are submerged in cold salinated water:
  i. (Original) at least partially desalinated product water and
  ii. (Original) concentrate or brine;
 b. pumping the product water through a submerged first pump and upward through a first conduit for surface or subsea use;
 C. pumping the concentrate or brine through a submerged second pump upward through a second conduit to a closed or open cycle OTEC heat engine;
 d. optionally pumping additional salinated water through a third pump for addition to and dilution of concentrate or brine in the second conduit;
 e. pumping warm salinated water having a temperature greater than that of the cold salinated water through a fourth pump and to the OTEC heat engine;
 f. operating the OTEC heat engine to provide electrical energy, the OTEC heat engine comprising:
  i. A condenser cooled by the concentrate or brine,
  ii. (Original) a coupled turbine and generator that rotate to provide electrical power,
  iii. in a closed cycle OTEC heat engine, an evaporator heated by the warm salinated water; a working fluid that evaporates to a vapor phase in the evaporator, the vaporized working fluid rotating the turbine and condensing to a liquid phase in the condenser; and a fifth pump that circulates the working fluid through a third conduit from the condenser to the evaporator to the turbine and back to the condenser; and in an open cycle OTEC heat engine, an evaporator that vaporizes the warm salinated water, the vaporized water rotating the turbine and condensing to a liquid phase in the condenser;
 wherein the OTEC heat engine provides electrical energy from the vaporized working fluid or vaporized water to at least partially drive one or more of the first through fifth pumps.

* * * * *